United States Patent [19]

Bean, Jr.

[11] 3,731,859
[45] May 8, 1973

[54] COMBINATION CAR TOP RACK AND TABLE

[76] Inventor: Carl N. Bean, Jr., 133 Celeste Circle, Chapel Hill, N.C. 27514

[22] Filed: Nov. 15, 1971

[21] Appl. No.: 198,670

[52] U.S. Cl..............224/42.01, 108/44, 224/42.1 E
[51] Int. Cl. ................................................B60m 9/04
[58] Field of Search ......................224/42.01, 42.1 E, 224/42.1 R, 29 R; 108/27, 19, 44, 47, 48

[56] References Cited

UNITED STATES PATENTS

| 2,721,681 | 10/1955 | Daniel | 224/42.01 X |
| 3,009,615 | 11/1961 | Baxter | 224/42.01 |
| 3,004,678 | 10/1961 | Golaski | 224/42.01 X |
| 3,512,620 | 5/1970 | Bell et al | 108/19 X |
| 3,232,502 | 2/1966 | Kleinbortas | 224/42.01 |

FOREIGN PATENTS OR APPLICATIONS

| 308,725 | 3/1955 | Switzerland | 224/42.1 |

*Primary Examiner*—Gerald M. Forlenza
*Assistant Examiner*—Jerold M. Forsberg
*Attorney*—B. B. Olive et al.

[57] ABSTRACT

A combination car top rack and table supports and secures luggage or other gear in transit and converts to a table when not in transit. A plurality of side rail members adjust to various positions useful both as part of a car rack and a table.

1 Claim, 13 Drawing Figures

PATENTED MAY 8 1973 3,731,859

INVENTOR
Carl N. Bean, Jr.
BY
B. B. Olive
ATTORNEY

PATENTED MAY 8 1973
3,731,859
SHEET 2 OF 2
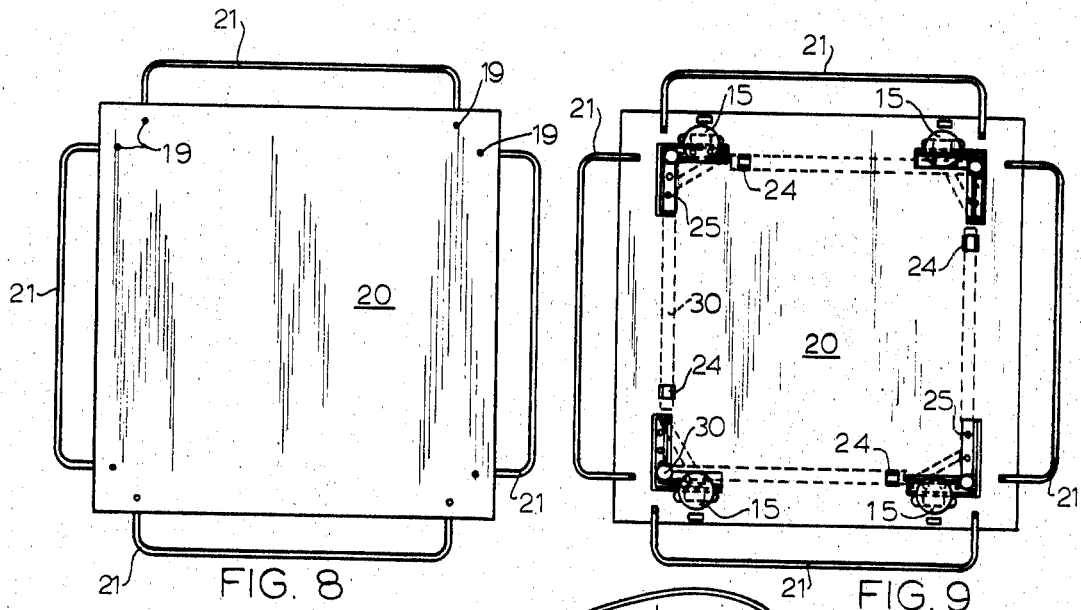
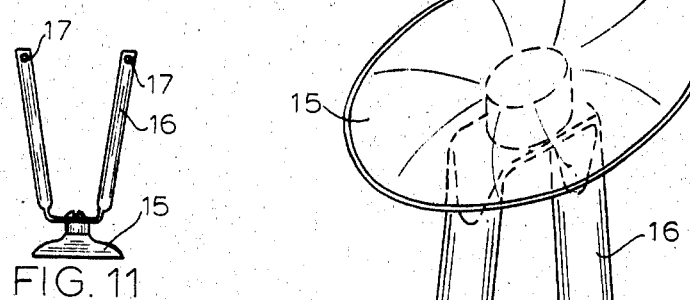
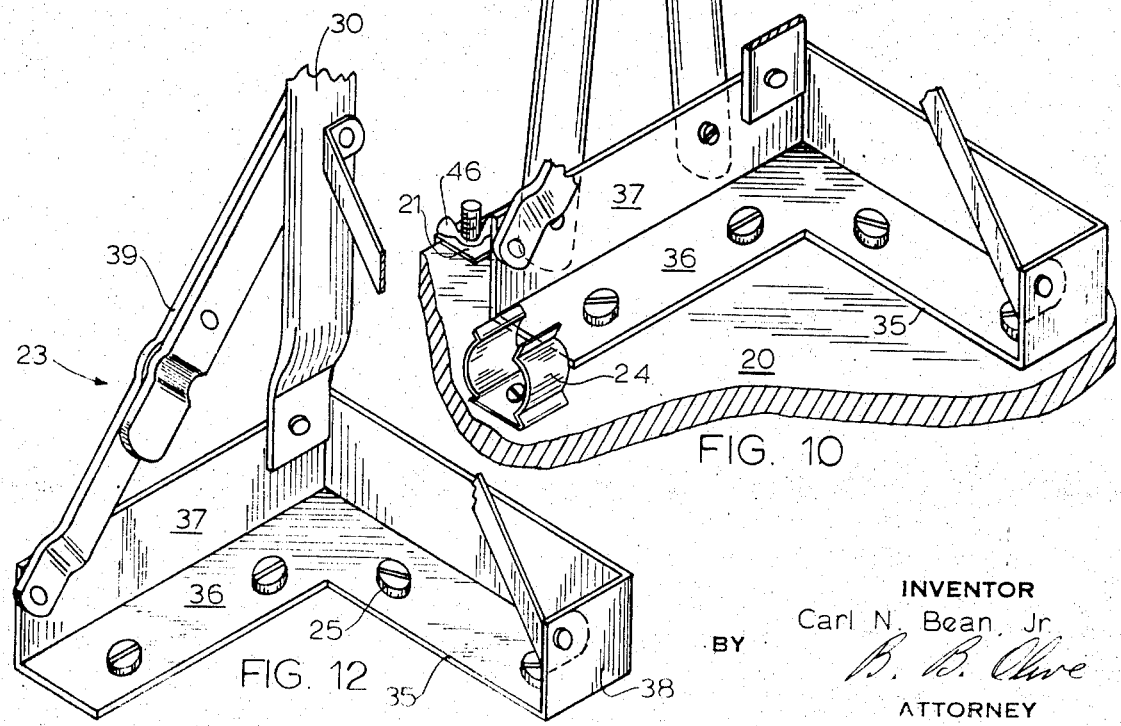
INVENTOR
Carl N. Bean, Jr.
BY
B. B. Olive
ATTORNEY

COMBINATION CAR TOP RACK AND TABLE

BACKGROUND OF THE INVENTION

1. Field of the Invention

This invention relates broadly to luggage racks, and particularly to car top carriers having multiple functions.

2. Description of the Prior Art

Various types of car top racks have been devised which are used to support luggage, gear, skis and the like atop a car, and which protect the finished surfaces of the car from scratches, dents or abrasions which would result from simply strapping items to the top of the car. Very often these devices have been found suitable for hauling camping equipment to a camp site but none have been suitable for other practical uses. Frequently car top luggage racks or carriers have employed side rail members at each edge for the purpose of limiting movement and securely strapping the gear so that it does not shift during transit, but the utility of these rails has been restricted to use only with the luggage rack.

Many campers transport and use tables at the camp site when cooking, dining, or playing cards. Those campers using tents frequently pack their equipment on a car top rack and also pack a table on the rack. Thus, a combination car top rack and table as a measure of economy both in cost of an additional portable table, and in extra room for packing has been needed but not been available.

SUMMARY OF THE INVENTION

A combination car top rack and table in a preferred embodiment of the invention comprises a substantially rigid panel of plywood or the like to which are attached adjustable side rails, suction cups on short fixed legs and foldable table legs. The side rails, cup-legs and folding legs may be positioned for use either as a luggage rack for supporting and securely strapping gear to the top of a vehicle or as a table once the destination has been reached. The side rails may be used in one position to secure luggage during transit and may be otherwise positioned for use as a towel rack and other purposes when the rack is formed as a table. An object of the invention is therefore to provide a device which may be used as a car top rack for transporting gear atop a vehicle and certain of whose parts can be positioned to form a table and towel rack upon reaching the destination.

DESCRIPTION OF THE DRAWINGS

FIG. 8 is a top view of a combination car top rack and table of the invention showing the rail members in the horizontal position.

FIG. 9 is a bottom view of the underside of the combination car top rack and table of the invention showing the rail members in the horizontal position, the table legs in the upright table position and with dashed lines the location of the table legs when in the closed position.

FIG. 10 is a partial perspective view of the typical suction cup-leg assembly, as attached to the base of a movable leg assembly.

FIG. 11 is a side view of the suction cup assembly.

FIG. 12 is a partial perspective view of a movable leg assembly.

DESCRIPTION OF THE INVENTION

Figure 1:
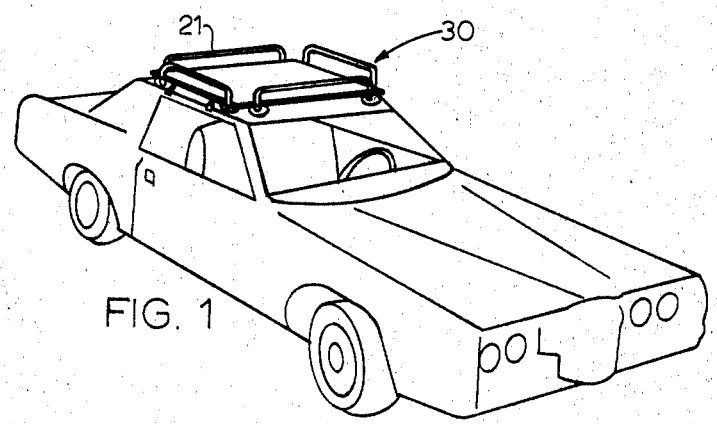
FIG. 1 is a perspective drawing of a combination car top rack and table shown in position atop a car.

Referring to FIG. 1, the combination car top rack and table is comprised basically of a panel 20, removable rail members 21, suction cup-leg assemblies 22 and movable table leg assemblies 23.

Figure 5:
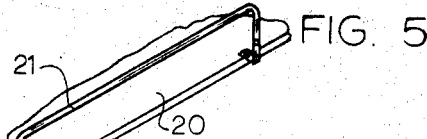
FIG. 5 is a partial perspective view of a rail member fastened for use in the vertical up position.
Figure 6:
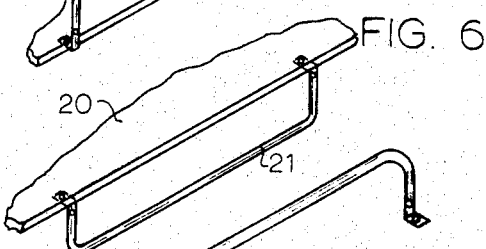
FIG. 6 is a partial perspective view of a rail member fastened for use in the vertical down position.
Figure 4:
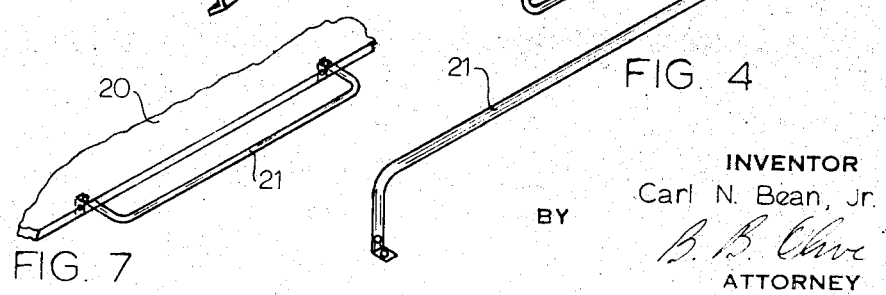
FIG. 4 is a perspective view of a rail member.
Figure 7:
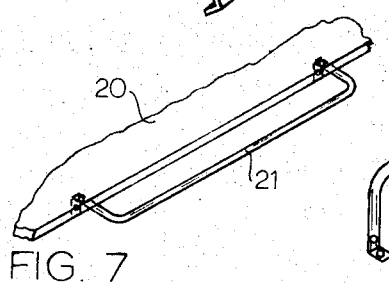
FIG. 7 is a partial perspective view of a rail member fastened for use in the horizontal position.

Each rail member 21 is made of tubular aluminum with a flattened and right angled end. Each end has a pair of holes as shown in FIG. 4 and which by means of wing nuts 46 and bolts enables the rail member to assume either vertical up (FIG. 5), horizontal (FIG. 7) or vertical down (FIG. 6) positions.

A suction cup assembly consists of a suction cup 15, which may be a rubber or similar material, suitably attached to a short U-shaped leg member 16 which can be made of tubular aluminum with appropriate holes 17 at suitable points of attachment. Each respective suction cup-leg assembly 22 is attached to a respective table leg assembly 23 as best seen in FIG. 10.

Each table leg assembly 23 (FIG. 12) comprises a base member 35, having base 36, and side walls 37 in a right angle configuration with one closed end 38. Holes are provided at appropriate points of attachment to receive screws 25 for attaching panel 20 to conventional hinge members 39 to complete the assembly. Each leg 30 may be made of tubular aluminum with a flattened end for pivotal attachment with the base as shown in FIG. 12.

Figure 13:
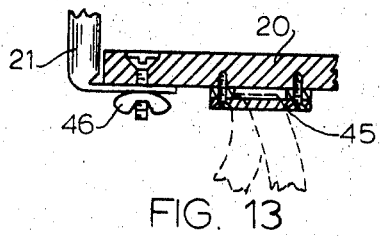
FIG. 13 is a partial side view of a typical wing nut fastening and gutter strap cleat arrangement.

In preparation for a trip the legs 30 of the combination car top rack and table are folded to the closed position (see dashed lines FIG. 9) and secured with spring clips 24. The rail members 21 are assembled by wing nuts 36 in the vertical up position, as in FIG. 5, and the gutter straps 31 are looped through cleats 45 (FIG. 13) attached to the bottom of panel 20 and through the gutter strap clips 50. The rack is then placed on top of the car roof where it rests on the suction cup assemblies. The adjustable gutter straps 31 are attached to the respective vehicle rain gutters by means of the gutter strap clips 50 and are then tightened. The assembled and mounted car top rack is then ready to accept luggage or gear at which time rail members 21 provide a convenient means to lash the gear to the rack. Where sheets of plywood, ladders or the like are being hauled on the car roof, rail members 21 may be easily moved to the horizontal or vertical down position to provide a less obstructed rack area but without losing the usefulness of the rail members for tying the load.

Once the destination has been reached and unloading has been completed, the combination car top rack and table is lifted from the vehicle and converted to a table by unfolding legs 30 into the open position (FIG. 2) and placing the table upright for use. The rail members will of course change from the vertical up position for the car top rack (FIG. 1) to the vertical down position (FIG. 2) more suited to use with the table. Should the table be used in cooking or washing procedures rail members 21 can be positioned into the horizontal position (FIG. 7) to receive towels and the like.

Figure 2:
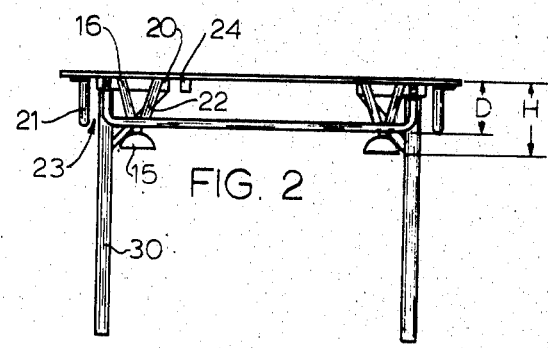
FIG. 2 is a side view of a combination car top rack and table assembled for use as a table.
Figure 3:
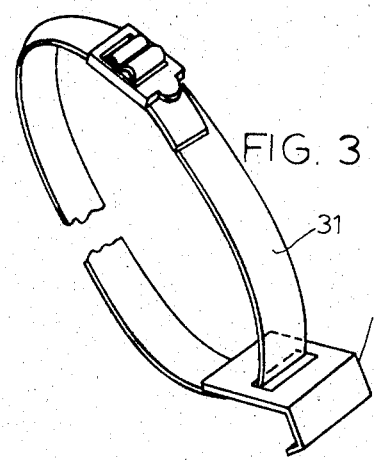
FIG. 3 is a perspective view of a segment of a gutter strap used for fastening the assembled car top rack to the vehicle rain gutters.

A different use of the table provided by the invention is for use as low level flooring or shelf space for foodstuffs inside a tent. For this use the table legs 30 are moved to the closed position and the table rests on the respective cups 15. As best shown in FIG. 2 the cup-leg dimension "H" is slightly more than the rail member depth "D" which enables the cup assemblies to provide such support. Alternatively, the rail members 21 may be designed with a dimension "D" greater than the dimension "H" and the table may rest on the rail members 21 rather than on the cups 15. In either case the table of the invention may provide either a low level storage utility when items must be kept off the ground or a relatively high level table.

What is claimed is:

1. In a combination car top rack and table, in combination:

a. a rectangular substantially rigid panel;

b. support means comprising a plurality of suction cup leg assemblies secured to a selected side on the corners of said panel and adapted to support said panel on the roof of a car when in transit and to support said panel as a relatively low table when off said car;

c. strap fastener means adapted to releasably secure selected edges of said panel to the gutters of said car when in transit;

d. a set of foldable leg members each having one inner end pivotally mounted on a corner of said panel on the same selected side as said support means and adapted to be folded against said selected side when in transit and to be unfolded to support said panel as a table when not in transit and including spring clip means on said selected side for each respective foldable leg adapted to releasably secure the respective outer ends of said foldable leg members to said selected side when in transit; and e. a plurality of rail members each including in a U-like form a straight rod portion and in the same plane right angled end portions adapted to be releasably secured to said panel selected side and individually positionable in relatively vertically up, vertically down, and horizontal positions with respect to said panel both when said panel is mounted on said car as a rack and when off said car as a table, enabling said rail members when positioned vertically up to form a luggage rack surrounding the panel side opposite said selected side during transit and to leave said opposite side as a free work surface when positioned vertically down or horizontal when off said car.

* * * * *